United States Patent
Rummel et al.

(10) Patent No.: US 7,620,916 B2
(45) Date of Patent: Nov. 17, 2009

(54) USER INTERFACE NAVIGATION IN SOFTWARE APPLICATIONS

(75) Inventors: Bernard Rummel, Schriesheim (DE); Heinz Willumeit, Leimen (DE)

(73) Assignee: SAP AG, Walldorf (DE)

(*) Notice: Subject to any disclaimer, the term of this patent is extended or adjusted under 35 U.S.C. 154(b) by 505 days.

(21) Appl. No.: 10/674,875

(22) Filed: Sep. 29, 2003

(65) Prior Publication Data

US 2005/0071779 A1    Mar. 31, 2005

(51) Int. Cl.
*G06F 3/048* (2006.01)
(52) U.S. Cl. .............. 715/860; 715/825; 715/728; 715/788; 715/779; 715/835
(58) Field of Classification Search .............. 715/825, 715/728, 778, 779, 835, 851, 974, 860
See application file for complete search history.

(56) References Cited

U.S. PATENT DOCUMENTS

| | | | | |
|---|---|---|---|---|
| 5,714,971 A * | 2/1998 | Shalit et al. | | 715/804 |
| 5,761,610 A * | 6/1998 | Sorensen et al. | | 455/558 |
| 5,828,374 A * | 10/1998 | Coleman et al. | | 715/786 |
| 6,262,732 B1 * | 7/2001 | Coleman et al. | | 715/835 |
| 6,469,719 B1 * | 10/2002 | Kino et al. | | 715/810 |
| 6,829,615 B2 * | 12/2004 | Schirmer et al. | | 707/102 |
| 2003/0073462 A1 * | 4/2003 | Zatloukal et al. | | 455/558 |

* cited by examiner

*Primary Examiner*—Simon Ke
(74) *Attorney, Agent, or Firm*—Finnegan, Henderson, Farabow, Garrett & Dunner L.L.P.

(57) ABSTRACT

Methods and apparatus, including computer program products, implement techniques for rendering application user interfaces. Application data is displayed in user interface elements including two or more independent elements and one or more dependent elements. One of the independent elements can have the property of being the selected element and the application data displayed in the dependent elements is made to correspond to the application data displayed in the selected element. User input is received from a user to establish a normal mode or a decoupled mode of user interface operation. Navigation input is received to navigate from one user interface element to another user interface element. In the normal mode, navigation to an independent element causes the independent element to become the selected element. In the decoupled mode, navigation to an independent element does not change which, if any, of the independent elements is the selected element.

18 Claims, 5 Drawing Sheets

USER INTERFACE NAVIGATION IN SOFTWARE APPLICATIONS

BACKGROUND

The present invention relates to data processing by digital computer, and more particularly to rendering application user interfaces.

Some applications implement user interfaces (UIs) in a client program running in a client-server architecture, e.g., a Web browser. The UIs typically include controls operable by a user to interact with the applications. Controls can include buttons, menus, pull-down menus, dialog boxes, scroll bars, and any other controls that enable the user to view application data, invoke application functionality, and otherwise interact with an application. Each control has an associated control state, and the application has an associated UI state. The control states and the UI state can change based on user interaction. A visual representation of the application can be generated by rendering the UI state of the application in a client program running in a client-server architecture, e.g., a Web browser. The process of rendering the UI state can include generating a data structure, e.g., an HTML-DOM (Hypertext Markup Language—Document Object Model) tree that represents the UI state.

SUMMARY OF THE INVENTION

In general, in one aspect, the invention provides methods and apparatus, including computer program products, implementing techniques for rendering application user interfaces. The techniques include displaying application data in user interface elements including two or more independent elements and one or more dependent elements, where one of the independent elements can have the property of being the selected element. The application data displayed in the dependent elements is made to correspond to the application data displayed in the selected element. User input is received from a user to establish a normal mode or a decoupled mode of user interface operation, and a navigation input is received to navigate from one user interface element to another user interface element. In the normal mode, navigation to an independent element causes the independent element to become the selected element. In the decoupled mode, navigation to an independent element does not change which, if any, of the independent elements is the selected element.

Advantageous implementations of the invention include one or more of the following features. Receiving user input, from a user, switching to the normal mode from the decoupled mode, causes the independent element specified for the most recently received navigation input to become the selected element. The decoupled mode can be established when a key is pressed and held by the user, and the normal mode can be established when the key is released by the user. The key can include a control key on a keyboard. Application data can be displayed in a table having two or more rows and one or more detailed views, the rows being the independent elements and the one or more detailed views being the dependent elements. If one of the rows is the selected element, the application data displayed in the detail views is made to correspond to the application data displayed in the selected element. The dependent elements can include first level elements and second level elements, where one of the first level elements can have the property of being the first level selected element. The application data displayed in the second level elements is made to correspond to the application data displayed in the first level selected element. User input is received to navigate to the first level elements. In the normal mode, navigation to a first level element causes the first level element to become the selected element. In the decoupled mode, navigation to a first level element does not change which, if any, of the first level elements is the selected element. Receiving user input, from a user, switching to the normal mode from the decoupled mode, causes the first level element specified by the most recently received navigation input to become the first level selected element.

The invention can be implemented to realize one or more of the following advantages. The selected element can be changed from a first independent user interface element to a second independent user interface element without causing any intermediate independent user interface elements to become selected elements. The cursor can be moved using cursor control keys to navigate to the second independent user interface element without changing the selected element. If a roundtrip to the server is required to retrieve data associated with the selected element in a client server system, the server roundtrips that would otherwise be required for the independent user interface elements traversed during navigation (i.e., what would usually be intermediate selected elements) are eliminated. The time required to process and display the data associated with the independent user interface elements traversed during navigation is eliminated. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The invention is best practiced in an environment where a user interacts with a software application using one or more user interface (UI) controls provided by an application user interface. The user interface elements include independent elements and dependent elements. The user can designate one of the independent elements as a selected element and application data displayed in the dependent elements is made to correspond to the application data displayed in the selected element. The user designates the selected element using a cursor to select one of the UI controls, and changes the selected element by moving the cursor to select another UI control. Alternatively, if the user does not designate a selected element, the application designates one of the UI elements as a default selected element. The selected element is the UI element that is currently operable by the application. If there is data associated with the selected element, the associated data is displayed by the application, e.g., in a detail view in the user interface. If the selected element is a UI element that can receive user input, input focus is changed to the selected element.

The application has two modes of operation—a normal mode and a decoupled mode. In the normal mode of operation, the independent element selected by a current cursor position is always designated to be the selected element. In the normal mode, navigation to an independent element causes the independent element to become the selected element. If the user selects any intermediate UI elements while moving the cursor to a new selected element, each of the intermediate UI elements becomes the selected element while selected by the current cursor position. In the decoupled mode of operation, navigation to a new independent element does not change the independent element in the selected element. While the application is in the decoupled mode, changing the cursor position does not change the selected element. The UI element selected by the cursor when the application returns to the normal mode becomes the new selected element. The user avoids designating the intermediate UI elements as selected elements by switching to the decoupled mode before he starts moving the cursor, and exiting the navigation mode once the cursor is at the UI element to be designated as the new selected element.

Figure 1:
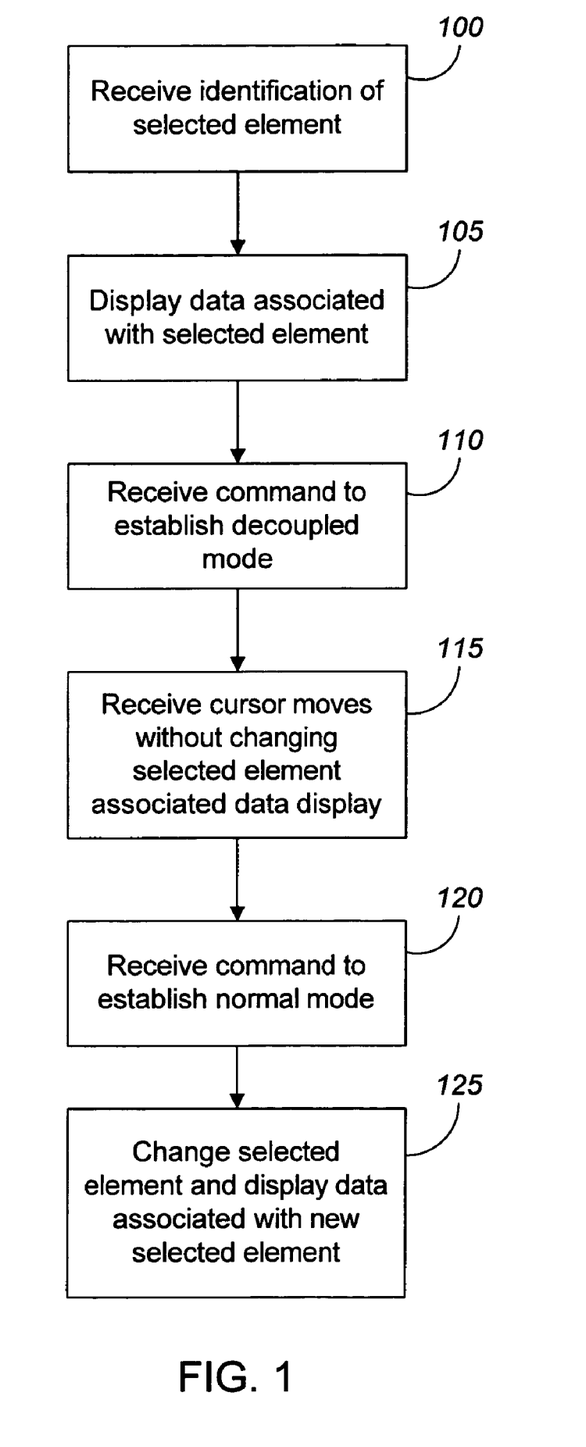
FIG. 1 is a flow diagram illustrating a method for changing the selected element in accordance with one aspect of the invention.

FIG. 1 is a flow diagram illustrating a method for changing the selected element in accordance with one aspect of the invention. An identification of a selected element is received (step 100), thereby identifying one of the independent elements as the selected element, and data corresponding to the selected element is displayed in the dependent elements (step 105). In one implementation, the dependent elements include one or more detail view areas and the data corresponding to the selected element is displayed in the detail view areas. A command establishing the decoupled mode of the application is received (step 110), and the selected element is decoupled from the cursor position. In the decoupled mode navigation input moving the cursor is received without changing the selected element and the associated data display (step 115). As described above, in the decoupled mode, the user can move the cursor to the independent element that is going to be the new selected element without changing the selected element. When a command establishing the normal mode is received (step 120), the independent element selected by the current cursor position becomes the new selected element, and data corresponding to the new selected element is displayed in the dependent elements (step 125). In one implementation, the data corresponding to the selected element in step 105 and step 125 is retrieved, processed, and/or stored without being displayed. In an alternative implementation, the application executes in a client in a client-server architecture and retrieves the corresponding associated data from the server.

In one implementation, the user uses the control key (CTRL) to establish the decoupled mode and the normal mode. The decoupled mode is established when the user presses the control key, and continues as long as the user keeps pressing the control key. The normal mode is established when the user releases the control key. In alternative implementations, a predefined key, a sequence of predefined keys, or UI controls in the user interface are used to establish the normal mode and the decoupled mode.

Figure 2A:
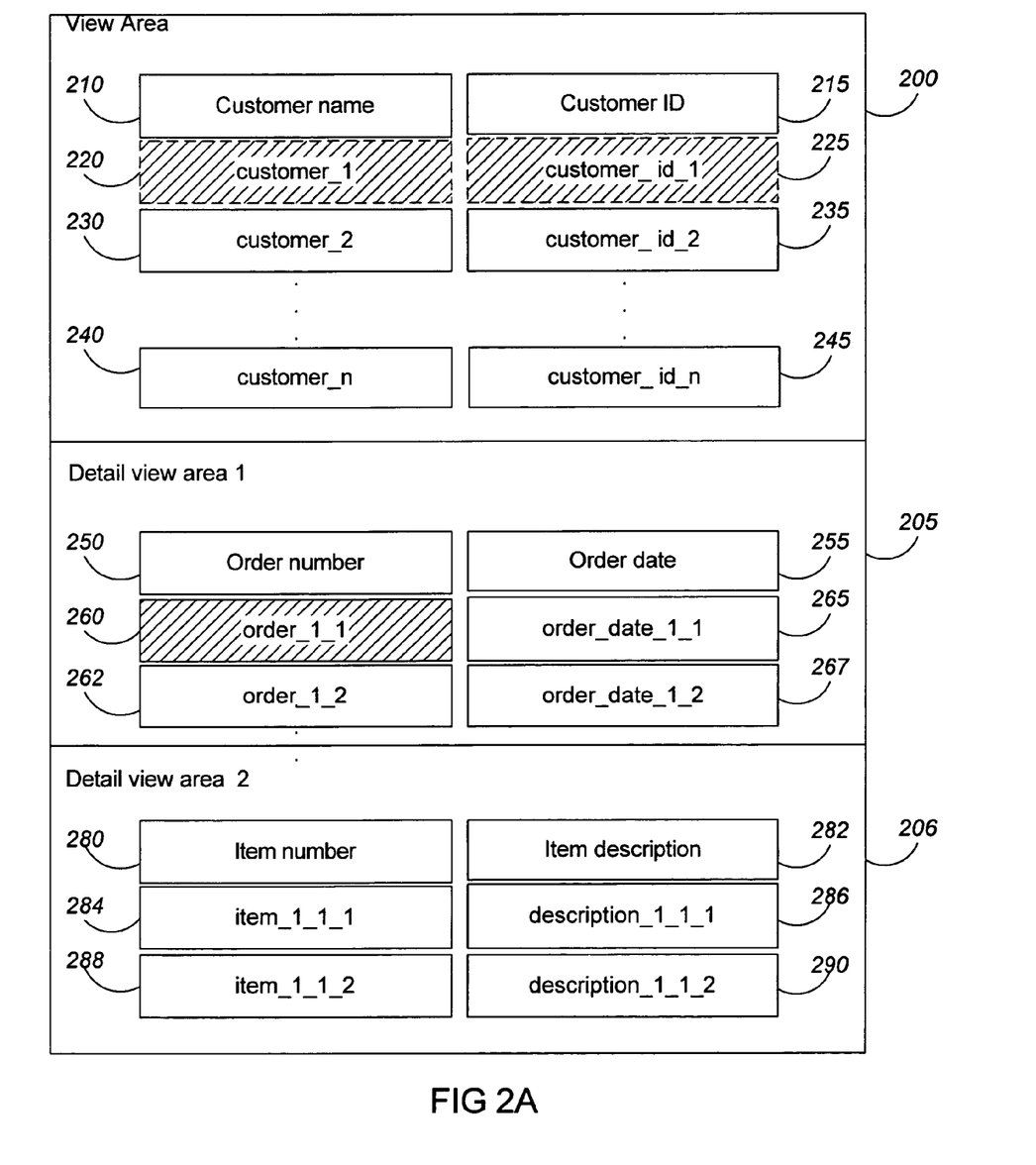
FIG. 2A illustrates the user interface (UI) controls of an example application with a selected element.

FIG. 2A illustrates the UI state of an example application with a selected element. The UI state includes a view area 200 displayed in the top half of the screen, and two detail view areas 205 and 206 displayed in the bottom half of the screen. The view area 200 displays a table of customers consisting of two columns, a column with the caption "Customer name" 210 and a column with the caption "Customer ID" 215. The column captioned "Customer name" contains a list of customer names, i.e., customer_1 220, customer_2 230, and customer_n 240. The column captioned "Customer ID" contains a list of customer IDs, i.e., customer_id_1 225, customer_id_2 235, and customer_id_n 245. The detail view area 205 displays a table of customer orders consisting of two columns, a column with the caption "Order number" 250 and a column with the caption "Order date" 255. The detail view area 205 displays orders for the customer designated as the selected element in the view area 200. The detail view area 206 displays a table of order items for a customer order number designated as the selected element in detail view area 205. Detail view area 206 has two columns, a column captioned "Item number" 280 and a column captioned "Item description" 282.

In the example in FIG. 2A, customer_1 220 is designated as the selected element in view area 200 and order_1_1 260 is designated as the selected in detail view area 205 (indicated by the gray filled rectangle). Detail view area 205 displays the orders for customer_1 and detail view area 206 displays the items in order_1_1 of customer_1. The customer designated as the selected element in FIG. 2A is also selected by the cursor position as indicated by the table cell drawn with dashed lines.

Figure 2B:
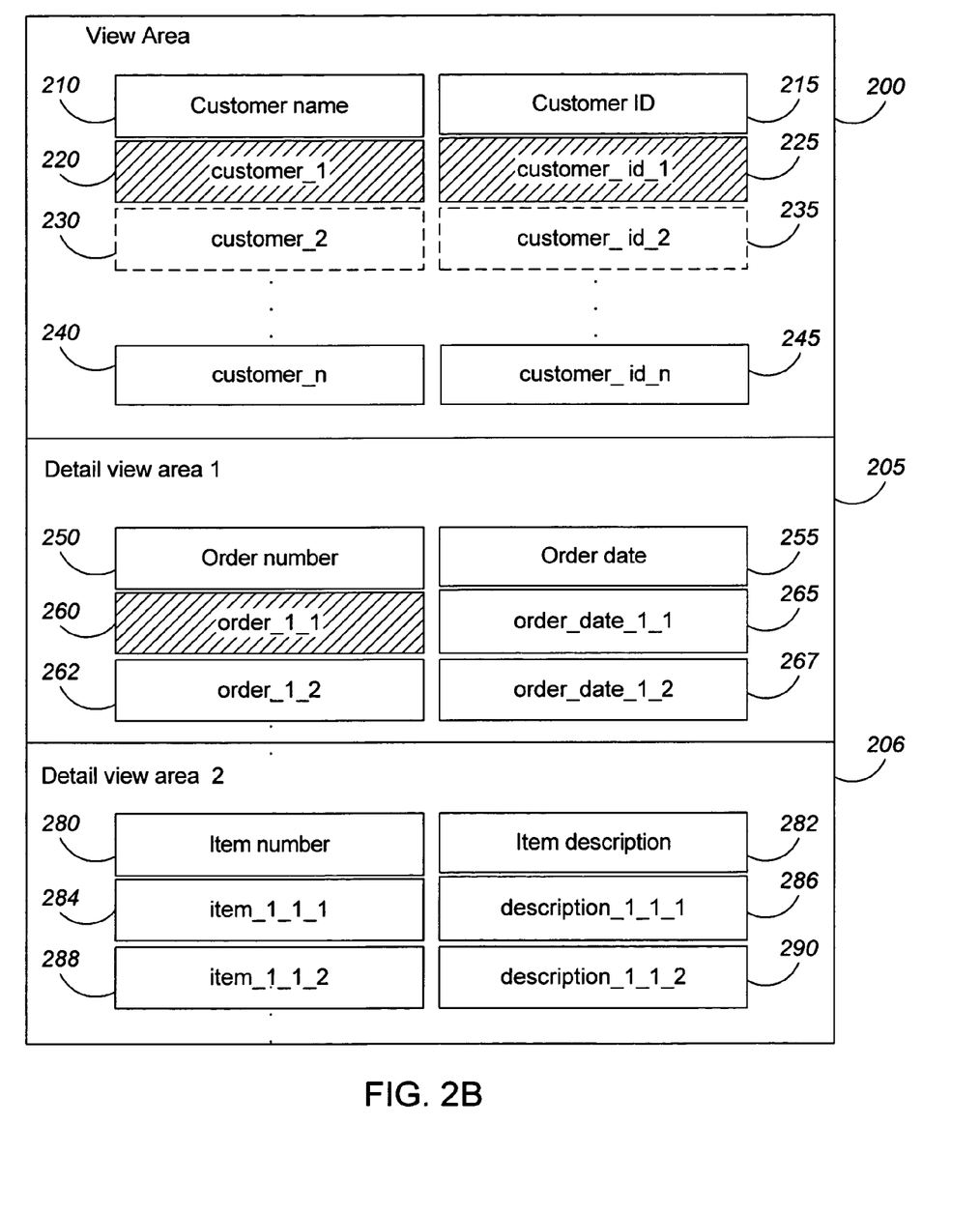
FIG. 2B illustrates the UI controls of the example application after initiating a navigation mode.

FIG. 2B illustrates the UI state of the example application after the selected element 220 is decoupled from the cursor position by establishing the decoupled mode. In the example, the cursor has been moved to the next row of the table containing customer_2 230 without changing the selected element. In the decoupled mode, the user can move the cursor, one row at a time, to navigate to a customer to be designated as the new selected element, while the selected element remains unchanged as customer_1 220. The detail view areas 205 and 206 continue to show data associated with customer_1 220, and order_1_1 260 as the cursor is moved to rows other than the selected element.

Figure 2C:
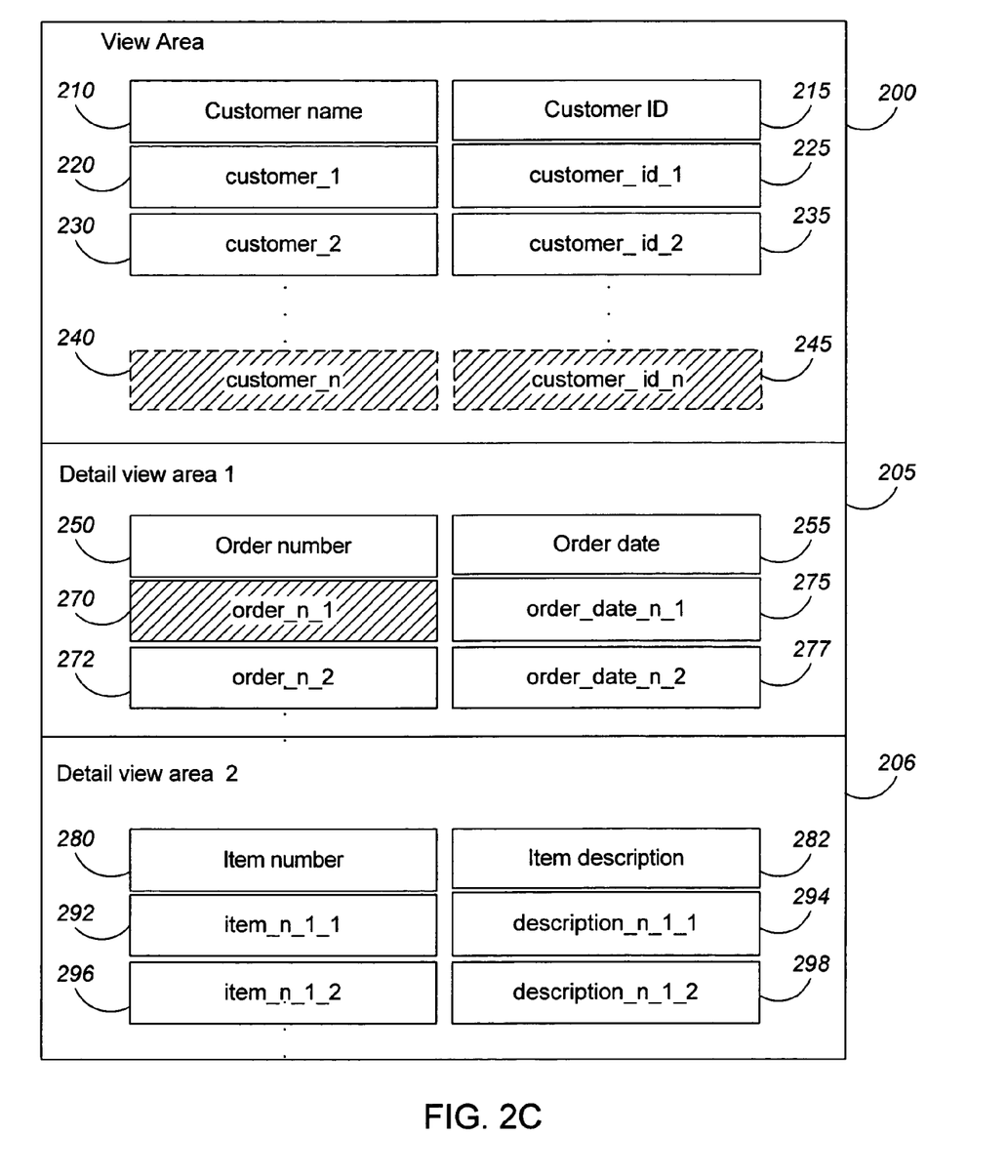
FIG. 2C illustrates the UI state of the example application after terminating the navigation mode.

FIG. 2C illustrates the UI state of the example application after the user has navigated the cursor to customer_n 240, and reverted to the normal mode. Reverting to the normal mode changes the selected element to customer_n 240 that is selected by the current cursor position. After the selected element is changed in the view area 200, the detail view areas 205 and 206 display data associated with customer_n. The detail view area 205 displays the orders for customer_n as order_n_1 270, order_date_n_1 275, order_n_2 272, and order_date_n_2 277. Order_n_1 270 is designated as the selected element in view area 205, e.g., as a default selection specified by the software application. The detail view area 206 displays items in order_n_1 as item_n_1_1 292, description_n_1_1 294, item_n_2_2 296, and description_n_2_2 298. The customer designated as the selected element in FIG. 2C is also selected by the cursor position as indicated by the table cell drawn with dashed lines.

Figure 2D:
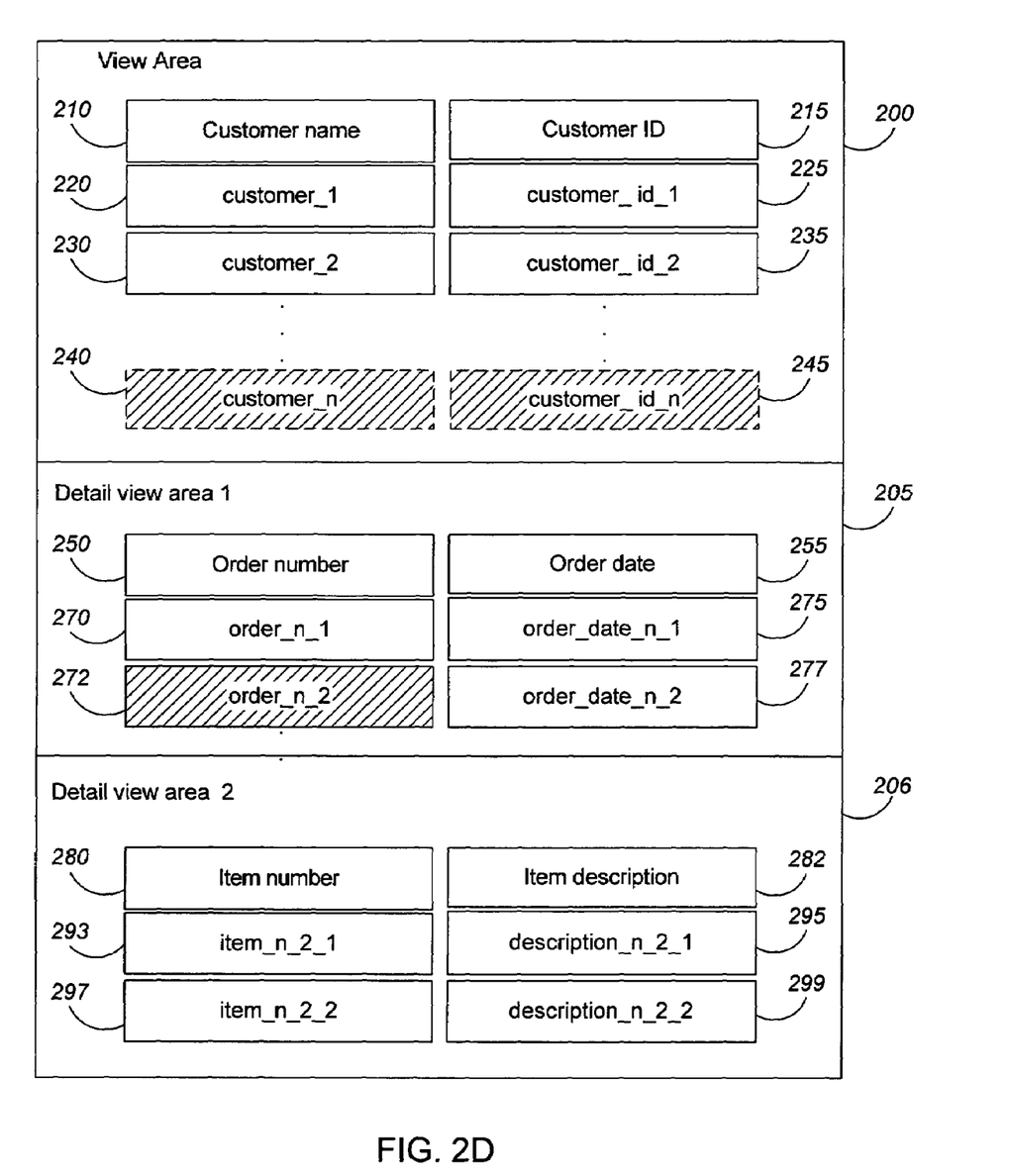
FIG. 2D illustrates the UI state of the application after a selected element in a detail view area has been changed.

The data displayed in detail view area 206 corresponds to the order designated as the selected element in detail view area 205. The selected element in detail view area 205 can be changed by establishing the decoupled mode, navigating the cursor to an order, and reverting to the normal mode, as a result of which the order becomes the selected element. FIG. 2D illustrates the UI state of the application after the selected element in detail view area 205 has been changed to order_n_2 272. The detail view area 206 displays items in order_n_2 as item_n_2_1 293, description_n_2_1 295, item_n_2_2 297, and description_n_2_2 299.

Underlying the foregoing example is application logic that makes data displayed at any or all detail levels correspond to data in a higher level through database searches, computations, or other forms of application logic.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication is network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, tangibly embodied in a computer-readable storage medium, comprising instructions operable to cause data processing apparatus to:

display application data in user interface elements, the user interface elements comprising two or more independent elements and one or more dependent elements, where one of the independent elements can have the property of being the selected element, and where the application data displayed in the dependent elements is made to correspond to the application data displayed in the selected element;

receive user input from a user to establish a decoupled mode when a key is pressed and held by the user, and to establish a normal mode when the key is released by the user; and receive navigation input distinct from the key used to establish the normal and decoupled modes to navigate from one user interface element to another user interface element, where in the normal mode, navigation to an independent element with the navigation input is sufficient to cause the independent element to become the selected element, and where in the decoupled mode, navigation to an independent element while the key is pressed and held by the user does not change which of the independent elements is the selected element.

2. The computer program product of claim 1, further comprising instructions operable to:

cause the independent element specified by the most recently received navigation input to become the selected element upon receiving user input from the user switching to the normal mode from the decoupled mode.

3. The computer program product of claim 1, wherein the key comprises a control key on a keyboard.

4. The computer program product of claim 1, further comprising instructions operable to:

display application data in a table having two or more rows and one or more detail views, the rows being the independent elements and the one or more detail views being the dependent elements, where if one of the rows is the selected element, the application data displayed in the detail views is made to correspond to the application data displayed in the selected element.

5. The computer program product of claim 1, wherein the dependent elements include first level elements and second level elements, where one of the first level elements can have the property of being the first level selected element, and where the application data displayed in the second level elements is made to correspond to the application data displayed in the first level selected element, further comprising instructions operable to:

receive user input to navigate to first level elements, where in the normal mode, navigation to a first level element causes the first level element to become the selected element, and where in the decoupled mode, navigation to a first level element does not change which, if any, of the first level elements is the selected element.

6. The computer program product of claim 5, further comprising instructions operable to:

receive user input from the user switching to the normal mode from the decoupled mode and thereupon cause the first level element specified by the most recently received navigation input to become the first level selected element.

7. A computer implemented method, comprising the steps implemented by a computer of:
displaying application data in user interface elements, the user interface elements comprising two or more independent elements and one or more dependent elements, where one of the independent elements can have the property of being the selected element, and where the application data displayed in the dependent elements is made to correspond to the application data displayed in the selected element;
receiving user input from a user to establish a decoupled mode when a key is pressed and held by the user, and to establish a normal mode when the key is released by the user; and
receiving navigation input distinct from the key used to establish the normal and decoupled modes to navigate from one user interface element to another user interface element, where in the normal mode, navigation to an independent element with the navigation input is sufficient to cause the independent element to become the selected element, and where in the decoupled mode, navigation to an independent element while the key is pressed and held by the user does not change which of the independent elements is the selected element.

8. The method of claim 7, further comprising:
causing the independent element specified by the most recently received navigation input to become the selected element upon receiving user input from the user switching to the normal mode from the decoupled mode.

9. The method of claim 7, wherein the key comprises a control key on a keyboard.

10. The method of claim 7, further comprising:
displaying application data in a table having two or more rows and one or more detail views, the rows being the independent elements and the one or more detail views being the dependent elements, where if one of the rows is the selected element, the application data displayed in the detail views is made to correspond to the application data displayed in the selected element.

11. The method of claim 7, wherein
the dependent elements include first level elements and second level elements, where one of the first level elements can have the property of being the first level selected element, and where the application data displayed in the second level elements is made to correspond to the application data displayed in the first level selected element, the method further comprising:
receiving user input to navigate to first level elements, where in the normal mode, navigation to a first level element causes the first level element to become the selected element, and where in the decoupled mode, navigation to a first level element does not change which, if any, of the first level elements is the selected element.

12. The method of claim 11, further comprising:
receiving user input from the user switching to the normal mode from the decoupled mode and thereupon causing the first level element specified by the most recently received navigation input to become the first level selected element.

13. An apparatus comprising:
means for displaying application data in user interface elements, the user interface elements comprising two or more independent elements and one or more dependent elements, where one of the independent elements can have the property of being the selected element, and where the application data displayed in the dependent elements is made to correspond to the application data displayed in the selected element;
means for receiving user input from a user to establish a decoupled mode when a key is pressed and held by the user, and to establish a normal mode when the key is released by the user; and
means for receiving navigation input distinct from the key used to establish the normal and decoupled modes to navigate from one user interface element to another user interface element, where in the normal mode, navigation to an independent element with the navigation input is sufficient to cause the independent element to become the selected element, and where in the decoupled mode, navigation to an independent element while the key is pressed and held by the user does not change which of the independent elements is the selected element; and
a processor for implementing at least the means for receiving navigation input.

14. The apparatus of claim 13, further comprising:
means for causing the independent element specified by the most recently received navigation input to become the selected element upon receiving user input from the user switching to the normal mode from the decoupled mode.

15. The apparatus of claim 13, wherein the key comprises a control key on a keyboard.

16. The apparatus of claim 13, further comprising:
means for displaying application data in a table having two or more rows and one or more detail views, the rows being the independent elements and the one or more detail views being the dependent elements, where if one of the rows is the selected element, the application data displayed in the detail views is made to correspond to the application data displayed in the selected element.

17. The apparatus of claim 13, wherein the dependent elements include first level elements and second level elements, where one of the first level elements can have the property of being the first level selected element, and where the application data displayed in the second level elements is made to correspond to the application data displayed in the first level selected element, further comprising:
means for receiving user input to navigate to first level elements, where in the normal mode, navigation to a first level element causes the first level element to become the selected element, and where in the decoupled mode, navigation to a first level element does not change which, if any, of the first level elements is the selected element.

18. The apparatus of claim 17, further comprising
means for causing the first level element specified by the most recently received navigation input to become the first level selected element upon receiving user input from the user switching to the normal mode from the decoupled mode.

* * * * *

UNITED STATES PATENT AND TRADEMARK OFFICE
CERTIFICATE OF CORRECTION

PATENT NO. : 7,620,916 B2
APPLICATION NO. : 10/674875
DATED : November 17, 2009
INVENTOR(S) : Rummel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Twenty-sixth Day of October, 2010

David J. Kappos
*Director of the United States Patent and Trademark Office*